United States Patent
Inomori et al.

(10) Patent No.: US 8,210,334 B2
(45) Date of Patent: Jul. 3, 2012

(54) MOTORCYCLE WITH CENTRIFUGAL CLUTCH

(75) Inventors: Toshinori Inomori, Shizuoka (JP); Yousuke Ishida, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 897 days.

(21) Appl. No.: 12/273,533

(22) Filed: Nov. 18, 2008

(65) Prior Publication Data

US 2009/0127054 A1    May 21, 2009

(30) Foreign Application Priority Data

Nov. 21, 2007 (JP) ................................ 2007-301714

(51) Int. Cl.
*F16D 43/24* (2006.01)
(52) U.S. Cl. .................................................. 192/105 B
(58) Field of Classification Search .................... 192/83, 192/105 B, 70.23, 85.5, 96, 35, 85.02, 70.11
See application file for complete search history.

(56) References Cited

U.S. PATENT DOCUMENTS

| 2,957,565 | A | 10/1960 | Brueder |
| 6,533,056 | B1 | 3/2003 | Maimone |
| 6,705,446 | B2 * | 3/2004 | Drussel et al. ................... 192/83 |
| 2010/0089680 | A1 * | 4/2010 | Inomori et al. ............... 180/219 |

FOREIGN PATENT DOCUMENTS

| FR | 1 185 251 | 7/1959 |
| GB | 887 736 | 1/1962 |

OTHER PUBLICATIONS

European Search Report, dated Apr. 15, 2011, counterpart application EP 08 02 0324.

* cited by examiner

*Primary Examiner* — David D Le
*Assistant Examiner* — David J Hlavka
(74) *Attorney, Agent, or Firm* — Dickstein Shapiro LLP

(57) ABSTRACT

A centrifugal clutch of a motorcycle has clutch housing which includes a friction plate, a clutch boss including a clutch plate, a pressure plate that pressure-contacts the friction plate with the clutch plate, a roller weight that receives a centrifugal force and presses the pressure plate toward a plate group side. The centrifugal clutch also includes an elastic body that constantly biases the pressure plate toward the plate group side to transmit a portion of a driving force from the clutch housing to the clutch boss even when the motorcycle engine is in an idling state. The elastic body may comprise a disc spring that biases the pressure plate toward the plate group and a coil spring that biases the pressure plate away from the plate group.

19 Claims, 6 Drawing Sheets

MOTORCYCLE WITH CENTRIFUGAL CLUTCH

PRIORITY INFORMATION

This patent application is based on and claims priority under 35 U.S.C. §119 to Japanese Patent Application No. 2007-301714, filed on Nov. 21, 2007, the entire contents of which is hereby expressly incorporated by reference.

TECHNICAL FIELD

The present invention relates to a motorcycle with a centrifugal clutch.

BACKGROUND ART

Motorcycles with centrifugal clutches are conventionally known. For example, U.S. Pat. No. 6,533,056 B1 to Maimone discloses a motorcycle which includes a centrifugal clutch. The centrifugal clutch is automatically engaged during motorcycle starting and automatically disengaged during stopping. Thus, there is no need for a rider to operate the clutch during motorcycle starting and stopping. The rider only operates the accelerator at starting and stopping with the burden on the rider as far as operation of the clutch is concerned being mitigated.

However, in a conventional motorcycle with a centrifugal clutch, such as the one described by Maimone, the centrifugal clutch is constantly disengaged while the motorcycle is in an idling state, and the vehicle cannot, therefore, slow down via engine breaking. Due to this, even at slow driving or the like during traffic jam, the vehicle cannot run unless the rider operates the accelerator to raise the rpm (revolutions per minute) of the engine to be equal to or larger than a predetermined number of revolutions. However, during a traffic jam or the like, even if a throttle is opened to raise the engine rpm to achieve temporary acceleration, the vehicle cannot continue to run at the accelerated speed and the vehicle is subsequently often forced to come to a stop by braking operation or the like. Therefore, it is often disadvantageously necessary to frequently open/close the vehicle throttle.

SUMMARY

The present invention has been made in view of the above problems. To this end, it is an object of the present invention to enable driving of a motorcycle with a centrifugal clutch at low speed through clutch operating.

A motorcycle according to the present invention includes an engine that generates a drive force, a drive wheel, a centrifugal clutch that freely and intermittently transmits the drive force generated by the engine to the drive wheel; and a clutch actuating element that is manually operated by the rider and disengages the centrifugal clutch. The centrifugal clutch includes a drive-side solid of revolution including a first plate, a driven-side solid of revolution including a second plate opposed to the first plate in a predetermined direction, a pressure plate that is operated by the clutch actuating element to move in the predetermined direction. The pressure plate rotates along with the drive-side solid of revolution and contacts the first plate with the second plate by moving in the predetermined direction.

Also included is a centrifugal weight that moves outward in a radial direction (of the pressure plate) according to a centrifugal force, and presses with a force according to the amount of movement in the radial direction the pressure plate in a direction in which the first plate establishes contact with the second plate. The pressure plate contacts the first plate with the second plate so as to transmit at least part of the torque of the drive-side solid of revolution from the first plate to the driven-side solid of revolution via the second plate even if the engine is in an idling state.

With the motorcycle in an idling state, part of the torque of the drive-side solid of revolution is transmitted to the driven-side solid of revolution. That is, even in the idling state, a so-called partial clutch engagement state is realized. Thus, even in an idling state, a portion of the driving force of the engine is transmitted to the drive wheel. Therefore, the rider can arbitrarily realize the partial clutch engagement state and a clutch disengagement state by operating the clutch actuating element. Thus, the motorcycle can be driven while it is in the idling state even though it includes a centrifugal clutch. The motorcycle is thus capable of running at low speeds by appropriately operating the clutch actuating element without repeatedly opening and closing the vehicle throttle.

As described above, a motorcycle with a centrifugal clutch according to the present patent document can run at low speeds through appropriate clutch operation.

DETAILED DESCRIPTION

A motorcycle 1 including a centrifugal clutch according to an embodiment will be described in reference to the drawings. It should be noted, however, that the motorcycle 1 described herein below is only an example of a preferred mode for carrying out the present invention. The motorcycle according to the present invention is not limited to the motorcycle 1 configuration described below. Nor is the motorcycle described herein limited to a two-wheeled vehicle but may be a vehicle having three or more wheels. In the present specification, the term "motorcycle" is intended to generally refer to vehicles of a type that are designed to lean into a curve when making a turn.

Figure 1:
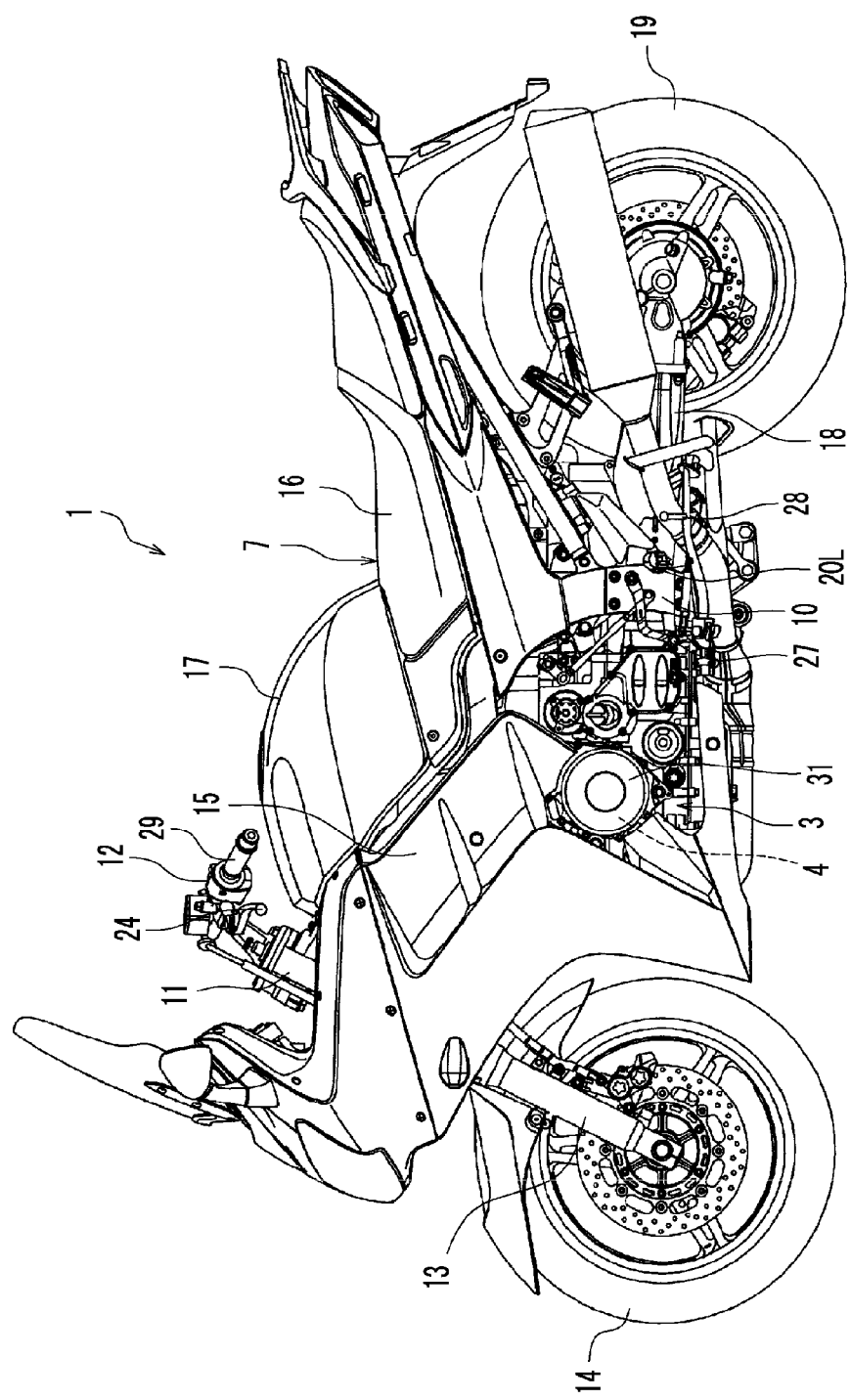
FIG. 1 is a side perspective view of a motorcycle.

FIG. 1 is a left side perspective view of motorcycle 1 according to an embodiment of the present invention. In the following description, it is assumed that longitudinal and crosswise directions are directions viewed from a passenger seated on a seat 16 to be described later.

Configuration of Motorcycle

As generally shown in reference to FIG. 1, motorcycle 1 includes a main body 7, a front wheel 14 provided on the front side of the main body 7, and a rear wheel 19 provided on the rear side of the main body 7.

The main body 7 includes a vehicle frame 10. The vehicle frame 10 includes a head pipe 11. A handle 12 is attached to an upper end of the head pipe 11. The front wheel 14 is rotatably attached to a lower end of the head pipe 11 via a front fork 13. A power unit 3 is suspended on the vehicle frame 10. A vehicle cover 15 is attached to the vehicle frame 10. A seat 16 is arranged from an almost central portion of the main body 7 to the rear side thereof in the longitudinal direction. A fuel tank 17 is disposed in front of the seat 16.

A rear arm 18 is swingably supported on the vehicle frame 10. The rear wheel 19, which serves as a drive wheel, is rotatably attached to the rear end of rear arm 18. The rear wheel 19 is coupled to an engine 4 (see FIG. 2) via a power transmission mechanism (not shown). Power from engine 4 is thereby transmitted to the rear wheel 19 to rotate the same.

An accelerator grip (not shown) serving as an accelerator actuating element is provided on the right side of the handle 12. A left grip 29 is provided on the left side of the handle 12. A clutch lever 24 (FIG. 1) serves as a clutch actuating element. As will be described later, clutch lever 24 is operated when a clutch 2 (see FIG. 2), is to be disengaged. Clutch lever 24 is provided on the left side of the handle 12 in front of the left grip 29.

A footrest 20L is provided at a central portion in the longitudinal direction of each of left and right sides of the main body 7. A shift pedal 27, which is operated when a transmission gear ratio of a transmission 5 (see FIG. 2), to be described later, needs to be changed. Shift pedal 27 is provided on the left side of the main body 7 and slightly forward of the left footrest 20L. A side stand 28 is provided on the left side of the main body 7 and below the shift pedal 27 and the footrest 20L.

Configuration of Power Unit

Figure 2:
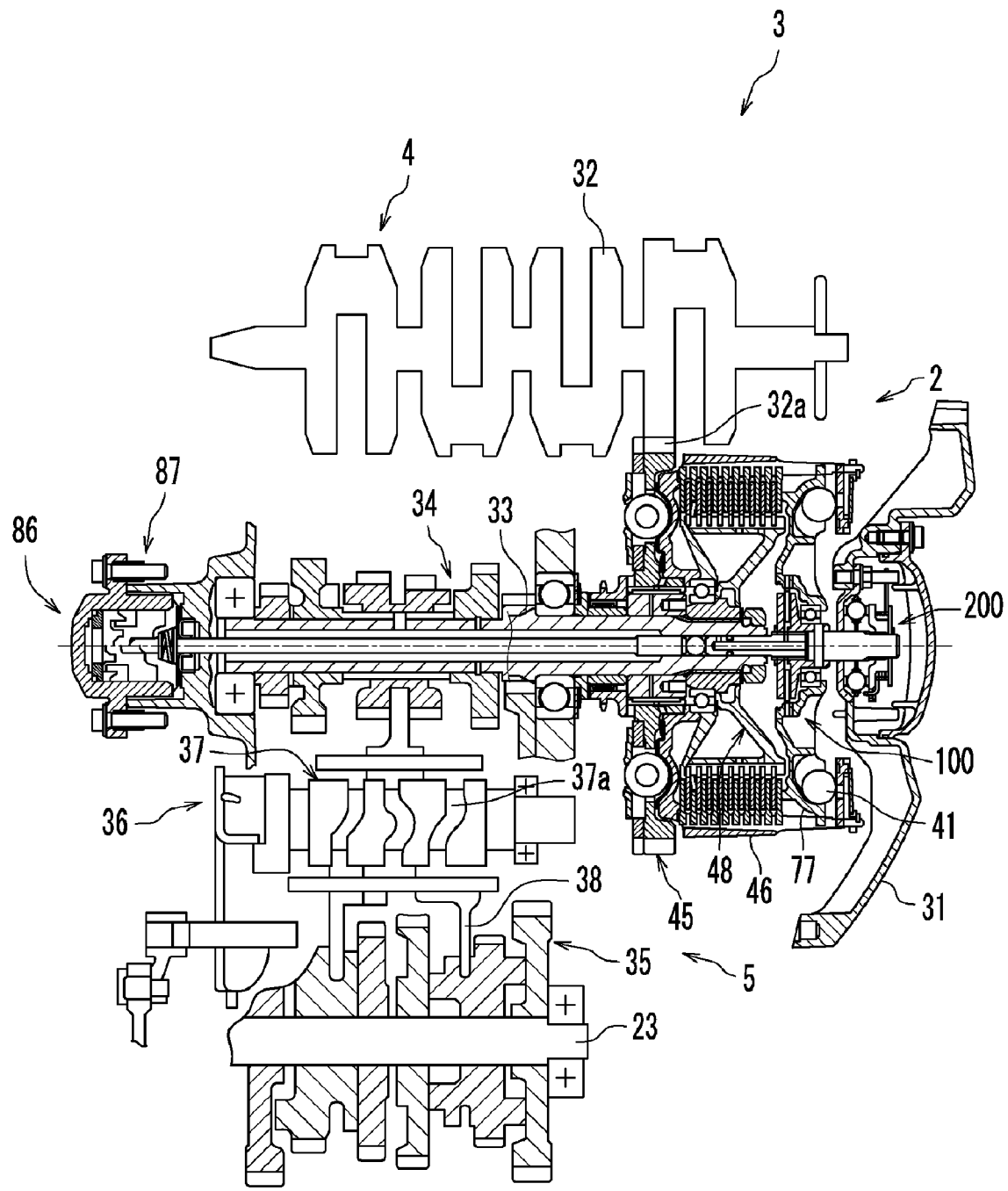
FIG. 2 is a schematic view of the principal components of a power unit of the motorcycle of FIG. 1.

Referring to FIG. 2, a configuration of the principal elements of the power unit 3 will next be described. As shown in FIG. 2, the power unit 3 includes the engine 4, the transmission 5, and the clutch 2. Although the type of the engine 4 is not limited to a specific type, the engine 4 is a water-cooled, four-stroke, transverse four-cylinder engine according to the present embodiment.

Although not shown, the engine 4 includes four cylinders, pistons reciprocating in the cylinders, respectively, and a crankshaft 32 connected to the pistons via a connecting rod. The crankshaft 32 extends in a vehicle width direction. Reference numeral 31 denotes a crankcase.

As shown in FIG. 2, the crankshaft 32 is operatively connected to the transmission 5 via the clutch 2. The transmission 5 includes a main shaft 33, a drive shaft 23, and a gear selection mechanism 36. The main shaft 33 is connected to the crankshaft 32 via the clutch 2. The main shaft 33 and the drive shaft 23 are respectively arranged in parallel to the crankshaft 32.

Multistage transmission gears 34 are attached to the main shaft 33. A plurality of transmission gears 35 that correspond to the multistage transmission gears 34 are attached to the drive shaft 23. The plurality of transmission gears 34 and the plurality of transmission gears 35 are engaged with one another based only on a one-to-one correspondence. At least either the transmission gears 34 other than the selected transmission gear 34 among the plurality of transmission gears 34 or the transmission gears 35 other than the selected transmission gear 35 among the plurality of transmission gears 35 are rotatable about the main shaft 33 or the drive shaft 23. That is, at least either the unselected transmission gear 34 or the unselected transmission gears 35 run idle about the main shaft 33 or the drive shaft 23. In other words, rotation is transmitted between the main shaft 33 and the drive shaft 23 only via the selected transmission gear 34 and the selected transmission gear 35 that engage with each other.

The gear selection mechanism 36 selects the transmission gears 34 and 35. Specifically, a shift cam 37 of the gear selection mechanism 36 selects the transmission gears 34 and 35. A plurality of cam grooves 37a is formed on an outer peripheral surface of the shift cam 37. A shift fork 38 is attached to each of the cam grooves 37a. The shift fork 38 is engaged with predetermined transmission gears 34 and 35 of the main shaft 33 and the drive shaft 23, respectively. With the rotation of the shift cam 37, each of a plurality of shift forks 38 is guided by the cam grooves 37a and moved in an axial (longitudinal) direction of the main shaft 33. Among the transmission gears 34 and 35, gears that engage with each other are thereby selected. Specifically, only paired gears according to a rotational angle of the shift cam 37 among the plurality of transmission gears 34 and 35 are fixed to the main shaft 33 and the drive shaft 23 by a spline. Positions of the transmission gears are thereby determined and the rotation is transmitted between the main shaft 33 and the drive shaft 23 at a predetermined gear ratio via the transmission gears 34 and 35. It should be noted that the gear selection mechanism 36 is operated by the shift pedal 27 shown in FIG. 1.

With such a configuration, when predetermined paired transmission gears 34 and 35 are fixed to the main shaft 33 and the drive shaft 23, the clutch 2 is engaged and the engine 4 is driven, the power of the engine 4 is transmitted to the main shaft 33 via the clutch 2. Furthermore, rotation is transmitted between the main shaft 33 and the drive shaft 23 at the predetermined transmission gear ratio via the predetermined paired transmission gears 34 and 35, thereby driving the drive shaft 23 to rotate. When the drive shaft 23 is driven to rotate, a transmission mechanism (not shown) such as a chain that connects the drive shaft 23 to the rear wheel 19 transmits a driving force to the rear wheel 19, thereby the wheel 19 is rotated. In the present embodiment, a power transmission mechanism connecting the engine 4 to the rear wheel 19 is constituted by the clutch 2, the transmission 5, and a transmission mechanism (not shown), such as a chain.

Configuration of Clutch 2

Figure 3:
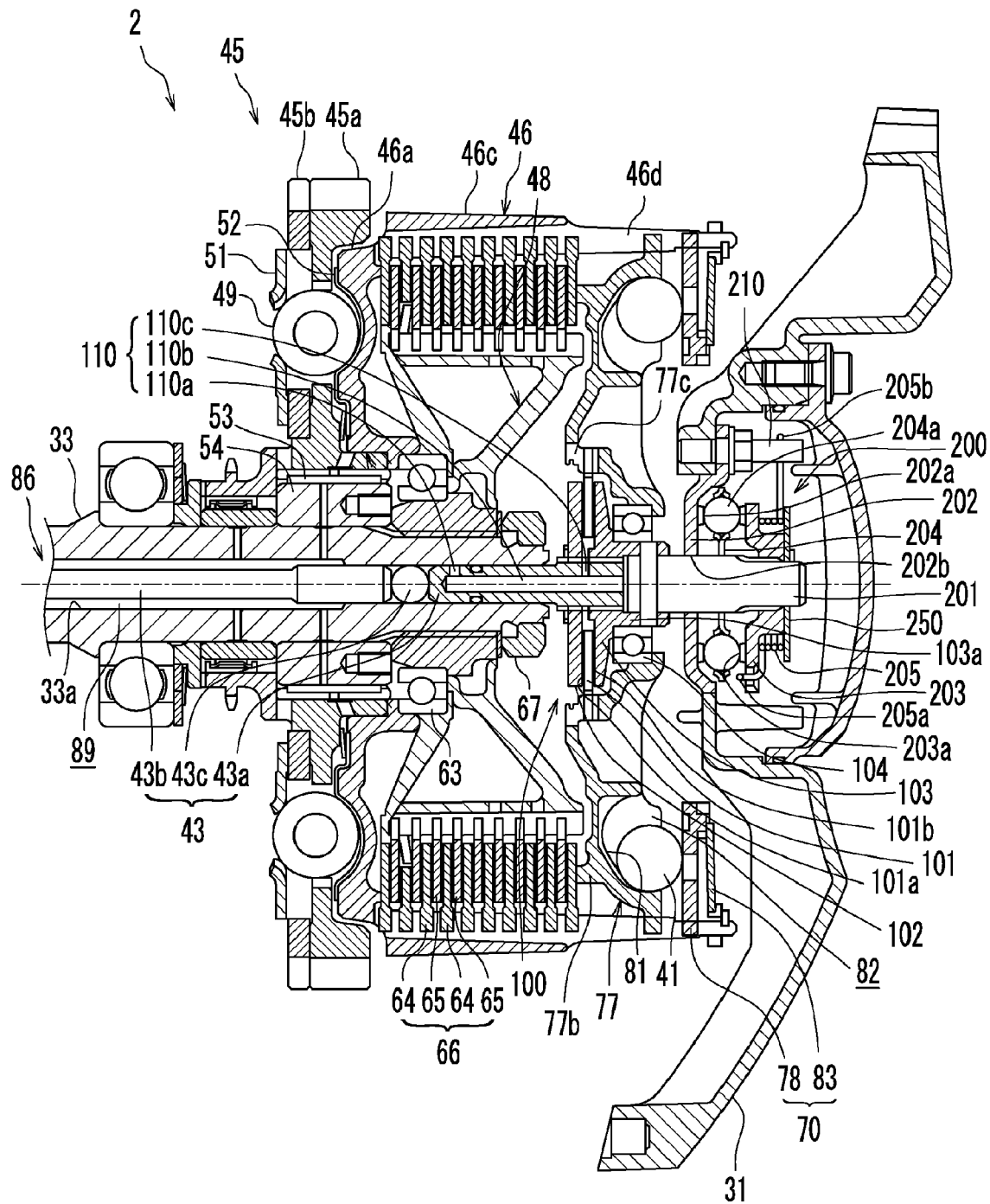
FIG. 3 is a cross-sectional view of a clutch used in the motorcycle of FIG. 1.
Figure 4:
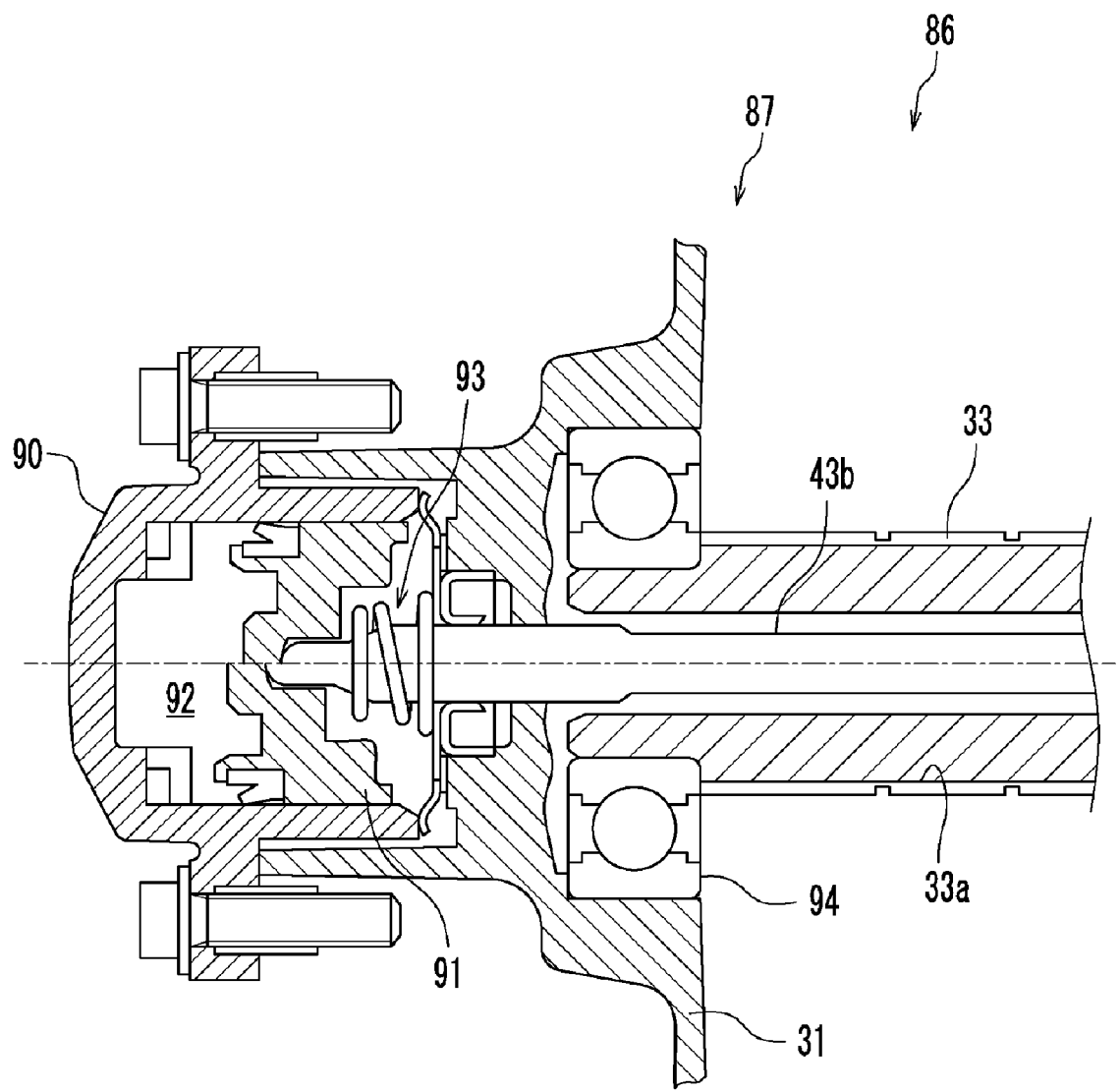
FIG. 4 is a cross-sectional view of a push rod drive mechanism that may be used to disengage the clutch.

In the present embodiment, the clutch 2 comprises a wet multi-plate friction clutch. Further, the clutch 2 is a centrifugal clutch that is automatically disengaged at the time of starting and stopping and which is optionally disengaged and engaged by operation of the clutch lever 24 by a rider. Referring to FIGS. 2, 3, and 4, a configuration of the clutch 2 will be described in detail.

Clutch Housing 46

As shown in FIG. 3, the clutch 2 includes a clutch housing 46. The main shaft 33 penetrates through the clutch housing 46. The clutch housing 46 includes a housing main body 46c. The housing main body 46c is formed into a substantially cylindrical shape having one end closed by a bottom 46a. The main shaft 33 is inserted through the bottom 46a of the housing main body 46c. The housing main body 46c includes a plurality of pairs of arms 46d. Each of the arms 46d extends from the bottom 46a toward the outside in the vehicle width direction.

As shown in FIGS. 2-3, the vehicle width direction is the crosswise direction. In the present embodiment, since the clutch 2 is arranged on the right side of the main shaft 33, the term "outside" in the vehicle width direction corresponds to the right side and the term "inside" in the vehicle width direction corresponds to the left side. Therefore, the "outside"

and "inside" in the vehicle width direction will be simply referred to as right side and left side, respectively.

Scissor Gear 45

A scissor gear 45 is attached to the clutch housing 46. The scissor gear 45 includes two gears 45a and 45b, a spring 49, and two plates 51 and 52. The gears 45a and 45b are located between the two plates 51 and 52. The two plates 51 and 52 are mutually fixed by a fixing tool, such as a rivet or a screw with respect to the axial direction of the main shaft 33. The two gears 45a and 45b are thereby substantially fixed to each other with respect to the axial direction of the main shaft 33. With respect to the rotational direction, the two gears 45a and 45b are thereby rotatable about each other.

The gears 45a and 45b have equal number of teeth. The gears 45a and 45b are arranged so that the teeth are alternately located in a circumferential direction. The spring 49 is provided between the gears 45a and 45b. Thus, a torsion torque is applied to the gears 45a and 45b by the spring 49. The torsion torque absorbs variable torque of the engine 4.

The gear 45a of the scissor gear 45 is engaged with a gear 32a (FIG. 2) of the crankshaft 32. The gear 45a (of the scissor gear 45) is fixed to the bottom 46a of the clutch housing 46 so as not to be relatively rotatable. With such a configuration, the gear 45a of the scissor gear 45 and the clutch housing 46 integrally rotate following the rotation of the crankshaft 32.

A needle bearing 53 and a spacer 54, which is nonrotatably fixed to the main shaft 33, are disposed between the scissor gear 45 and the main shaft 33. The scissor gear 45 is rotatable about the main shaft 33 by the needle bearing 53. Rotation of the scissor gear 45 is thus configured such that it is not transmitted directly to the main shaft 33.

Clutch Boss 48

A clutch boss 48 is nonrotatably fixed to the main shaft 33 by a nut 67. That is, the clutch boss 48 rotates along with the main shaft 33. A thrust bearing 63 is disposed between the clutch boss 48 and the scissor gear 45. Thus, the scissor gear 45, the needle bearing 53, the spacer 54, and the clutch boss 48 are restricted by the thrust bearing 63 so as not to come close to one another within a predetermined distance or less. In other words, the scissor gear 45, the needle bearing 53, and the spacer 54 are restricted to move toward the clutch boss 48 in the axial direction of the main shaft 33.

Plate Group 66

A plurality of friction plates 64 are arranged inside the clutch housing 46. Each friction plate 64 is fixed to the clutch housing 46 with respect to the rotational direction of the main shaft 33. Thus, the plurality of friction plates 64 rotate along with the clutch housing 46. Each friction plate 64 is displaceable in the axial direction of the main shaft 33. Thus, the distance between two adjacent friction plates 64 is variable.

The plurality of friction plates 64 are arranged in the axial direction of the main shaft 33. A clutch plate 65 is disposed between adjacent friction plates 64. The clutch plate 65 is opposed to the adjacent friction plates 64. Each clutch plate 65 is fixed to the clutch boss 48 with respect to the rotational direction of the main shaft 33. Thus, the plurality of clutch plates 65 rotate along with the clutch boss 48. Further, each clutch plate 65 is displaceable with respect to the axial direction of the main shaft 33. Thus, the distance between mutually adjacent clutch plates 65 is variable.

In the present embodiment, a plate group 66 is constituted by the plurality of friction plates 64 and the plurality of clutch plates 65, as shown in FIG. 3.

Pressure Plate 77

A pressure plate 77 is arranged on the right side of the main shaft 33, as depicted in reference to FIG. 3. The pressure plate 77 is formed into a substantially disc shape. A sub clutch 100, to be described later, is provided on a center-side portion of the pressure plate 77. A radially outward end of the pressure plate 77 is engaged with a plurality of arms 46d. The pressure plate 77 is thereby not rotatable about the clutch housing 46 but it rotates along with the clutch housing 46.

A pressing portion 77b protruding toward the plate group 66 is formed in a radially outward portion of the pressure plate 77. This pressing portion 77b is opposed to the friction plate 64 located at a rightmost side of the plate group 66. If the pressure plate 77 moves leftward, the pressing portion 77b presses the plate group 66 leftward. As a result, the friction plates 64 and the clutch plates 65 of the plate group 66 are press-contacted more strongly.

On the other hand, a cam surface 81 that supports a roller weight 41 is formed on a surface opposite to the plate group 66 in the radially outward portion of the pressure plate 77. A plurality of cam surfaces 81 and a plurality of roller weights 41 are provided along the circumferential direction. The plurality of cam surfaces 81 are arranged radially about a longitudinal axis of the main shaft 33. The cam surfaces 81 are inclined in such a manner that they are directed to the right side along the radial direction.

A roller retainer 78 is arranged on the right side of the pressure plate 77. The roller retainer 78 is formed into a band ring when viewed from the axial direction of the main shaft 33. The roller retainer 78 is opposed to the cam surfaces 81 of the pressure plate 77. A space 82 that becomes narrower in the radial direction of the main shaft 33 is thereby formed by the cam surfaces 81 and the roller retainer 78.

Similarly to the pressure plate 77, a radially outward end of the roller retainer 78 is engaged with the plurality of arms 46d. The roller retainer 78 is thereby nonrotatable about the clutch housing 46. However, the roller retainer 78 rotates along with the clutch housing 46. The roller retainer 78 is displaceable with respect to the clutch housing 46 in the axial direction of the main shaft 33.

The roller retainer 78 is urged leftward by a disc spring 83 serving as a biasing member. In other words, the roller retainer 78 is urged toward the plate group 66 by disc spring 83. The roller retainer 78 and the disc spring 83 constitute an abutment member 70 that abuts the roller weight 41 toward the cam surfaces (81) side.

The roller weight 41 is provided in each of a plurality of spaces 82. The roller weight 41 revolves following the rotation of the clutch housing 46 and moves on the cam surface 81 radially outward by means of a centrifugal force generated during the revolution. The roller weight 41 receives a reaction force from the abutment member 70 and presses the pressure plate 77 toward the plate group (66) side.

As described later, in the present embodiment, the pressure plate 77 is configured to be in pressure-contact with the plate group 66 even in the idling state. Therefore, even in the idling state, the clutch 2 is in a partial clutch engagement state and driving force is transmitted to the rear wheel 19 so as to be able to drive the same at low speed in accordance with the present embodiment.

If the rpm of crankshaft 32 is relatively small, the rpm of the clutch housing 46 also becomes small. Thus, the centrifugal force acting on the roller weight 41 is relatively small and the roller weight 41 is located relatively inward. The force by which the roller weight 41 presses the pressure plate 77 leftward thereby becomes weak. As a result, the degree of pressure-contact with the plate group 66 becomes weak and the torque transmitted from the clutch housing 46 to the clutch boss 48 becomes relatively small.

On the other hand, when the rpm of the crankshaft 32 is relatively large, the rpm of the clutch housing 46 becomes relatively large accordingly. Thus, as the rpm of the clutch housing 46 becomes larger, the centrifugal force acting on the roller weight 41 becomes stronger. If the centrifugal force acting on the roller weight 41 is equal to or greater than a predetermined value, the roller weight 41 moves outward. The pressure plate 77 is thereby pressed leftward by the roller weight 41 and moved toward the plate group 66. As a result, the plate group 66 is placed in a relatively strong pressed-contact state and the torque transmitted from the clutch housing 46 to the clutch boss 48 becomes relatively large accordingly.

Sub Clutch 100

As shown in FIG. 3, the clutch 2 according to the present embodiment includes a sub clutch 100. The sub clutch 100 includes a friction plate 101, a first pressing plate 102 facing a left surface (hereinafter, referred to as "first friction surface") 101a of the friction plate 101, and a second pressing plate 103 facing a right surface (hereinafter, referred to as "second friction surface") 101b of the friction plate 101.

The friction plate 101 is engaged with the pressure plate 77 so as to rotate along with the pressure plate 77. Specifically, a slide arm section 77c is formed on the pressure plate 77. A groove (not shown) is formed on a radially outward side of the friction plate 101. The friction plate 101 is configured so that if the groove of the friction plate 101 is slidably engaged with the slide arm section 77c, whereby the friction plate 101 rotates along with the pressure plate 77.

First pressing plate 102 is fixed to a short push rod 43a to be described later. Thus, the first pressing plate 102 is movable along with the short push rod 43a in the axial direction of main shaft 33. Furthermore, the first pressing plate 102 rotates along with the short push rod 43a.

The second pressing plate 103 is fitted onto the short push rod 43a by way of matching serrated surfaces. Thus, the second pressing plate 103 rotates along with the short push rod 43a but is movable relative to the short push rod 43a in the axial direction of main shaft 33. The second pressing plate 103 includes a boss 103a extending rightward. This boss 103a rotatably supports the pressure plate 77 via a bearing 104. The second pressing plate 103 and the pressure plate 77 are thereby relatively rotatable about each other. Furthermore, the second pressing plate 103 and the pressure plate 77 are configured to move integrally in the axial direction of main shaft 33.

When the short push rod 43a moves rightward, the first pressing plate 102 also moves rightward. The first pressing plate 102 presses the friction plate 101 against the second pressing plate 103 accordingly. As a result, the friction plate 101 is sandwiched between the first pressing plate 102 and the second pressing plate 103. A torque of the pressure plate 77 is thereby transmitted to the first pressing plate 102 and the second pressing plate 103 via the friction plate 101. The torque is applied to the first pressing plate 102 and the second pressing plate 103.

As described later, a through-hole 33a is formed within the main shaft 33. The short push rod 43a, a ball 43c, and a long push rod 43b of a push mechanism 43 are inserted into the through-hole 33a. A gap 89 between an inner wall of the through-hole 33a and the long push rod 43b serves as an oil supply path for supplying oil to the clutch 2.

Moreover, an oil supply path 110 that guides the oil in the gap 89 to the sub clutch 100 is formed in the short push rod 43a. The oil supply path 110 is configured to include an oil introduction path 110a formed in a left portion of the short push rod 43a, an oil path 110b formed at a central portion of the short push rod 43a, and an oil lead-out path 110c formed in a right portion of the short push rod 43a. The oil introduction path 110a comprises a hollow conduit extending in the radial direction and connected to the oil path 110b extending in an axial direction of main shaft 33. Likewise, the oil lead-out path 110c comprises a hollow conduit extending radially and connected to the oil path 110b. An outlet of the oil lead-out path 110c, that is, the radially outward opening of the oil lead-out path 110c, is open toward the first friction surface 101a and the second friction surface 101b of the friction plate 101. Thus, the oil on the oil supply path 110 is supplied toward the first friction surface 101a and the second friction surface 101b.

Toggle Mechanism

As shown in FIG. 3, the clutch 2 includes a toggle mechanism 200 according to the present embodiment. The toggle mechanism 200 converts part of the torque of the pressure plate 77 into a force for disengaging the clutch 2 so as to reduce the force required to disengage the clutch 2. The toggle mechanism 200 according to the present embodiment comprises a so-called ball cam. Particularly, the toggle mechanism 200 includes a slide shaft 201 fixed to the second pressing plate 103, a first cam plate 202, a second cam plate 203, a ball plate 204, and a coil spring 205 that biases the second cam plate 203 in a direction in which the second cam plate 203 separates from the first cam plate 202. A support plate 250 that supports the coil spring 205 by abutting a right portion of the coil spring 205 is fixed onto a terminal side of the slide shaft 201.

Figure 5A:
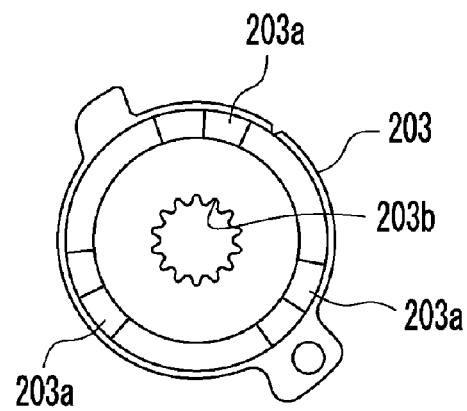
FIG. 5a is a rear view of a second cam plate.
Figure 5B:
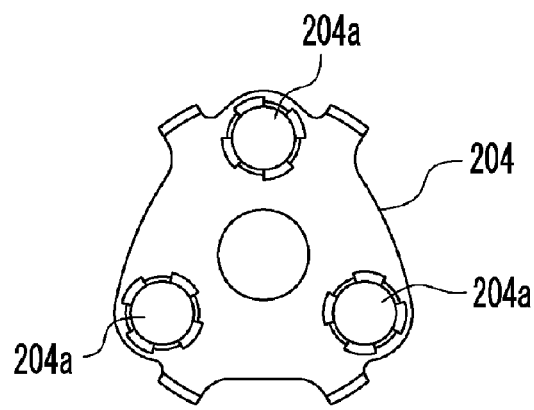
FIG. 5b is a front view of a ball plate.

As shown in FIG. 5(b), three balls 204a are rollably supported on the ball plate 204. The three balls 204a are arranged equidistantly in a circumferential direction about a longitudinal axis of the slide shaft 201. However, the number of balls 204a supported on ball plate 204 does not have to be limited to three. Other ball cam configurations may be utilized as needed.

Figure 5C:
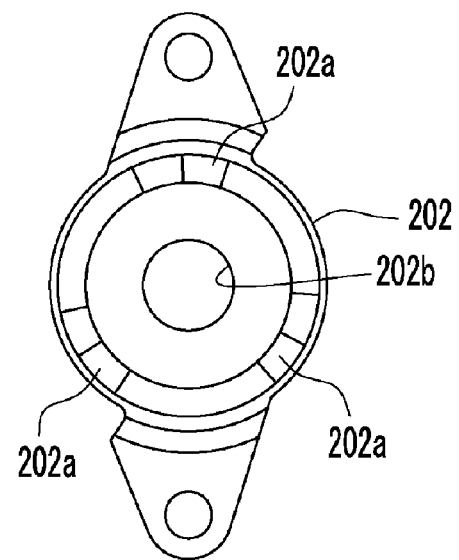
FIG. 5c is a front view of a first cam plate.

As shown in FIG. 5(c), a through-hole 202b is formed at a central portion of the first cam plate 202. As shown in FIG. 3, the slide shaft 201 is inserted through the through-hole 202b. The slide shaft 201 is movable axially with respect to the first cam plate 202 and rotatable with respect to the first cam plate 202. That is, the first cam plate 202 is configured not to rotate even if the slide shaft 201 rotates.

As shown in FIG. 5(a), a serrated hole 203b is formed at a central portion of the second cam plate 203. The second cam plate 203 is fitted onto a corresponding serrated portion of the slide shaft 201. Thus, the second cam plate 203 is axially movable with respect to the slide shaft 201 and rotates along with the slide shaft 201.

One end 205b of the coil spring 205 is secured to a pin 210 fixed to the crankcase 31. The other end 205a of the coil spring 205 is secured to the second cam plate 203. By doing so, the second cam plate 203 receives a torque from the coil spring 205 so as to rotate around the slide shaft 201 in a predetermined direction discussed below. Further, the second cam plate 203 receives a slide force for moving toward the first cam plate 202 in the axial direction of the slide shaft 201 by means of a biasing force that is a sum of a biasing force of the disc spring 83 and that of the coil spring 205.

A first cam surface 202a is formed on a right surface (or the front-side surface in FIG. 5c) of the first cam plate 202. A second cam surface 203a is formed on a left surface (or the front-side surface in FIG. 5a) of the second cam plate 203. The first cam surface 202a and the second cam surface 203a are formed so that the balls 204a ride on opposing cam lobes of cam surfaces 202a and 203a when the second cam plate 203 rotates in a predetermined direction and so that the balls 204a are circumferentially held between the opposing cam lobes of cam surfaces 202a and 203a when the second cam plate 203 rotates in a direction opposite to the predetermined direction back to the original rest position of the cam plate 203. In other words, both cam surfaces 202a and 203a are formed so that the two cam plates 202 and 203 are forced by the balls 204a to separate from each other and the second cam plate 203 moves rightward when the second cam plate 203 rotates in the predetermined direction against the biasing force that is the sum of the biasing force of the disc spring 83 and that of the coil spring 205. Furthermore, both cam surfaces 202a and 203a are formed so that balls 205b move leftward on cam surface 202a and cam surface 203a (together with cam plate 203) moves leftward by a biasing force that is the sum of the biasing force of the disc spring 83 and that of the coil spring 205 when the second cam plate 203 rotates in the opposite direction.

The coil spring 205 biases the second cam plate 203 of the toggle mechanism 200 and the slide shaft 201 rightward. On the other hand, the disc spring 83 biases the second cam plate 203 and the slide shaft 201 leftward. The biasing force by which the disc spring 83 biases the slide shaft 201 leftward is greater than the biasing force by which the coil spring 205 biases the slide shaft 201 rightward. Thus, disc spring 83 and the coil spring 205 urge, as a whole, the slide shaft 201 and second cam plate 203 leftward in FIG. 3, and, as a result, the pressure plate 77 is also urged leftward. In other words, the disc spring 83 and the coil spring 205 urge the pressure plate 77 toward the plate group 66 as a whole. The pressure plate 77 is thereby urged into a pressed-contact state with the plate group 66 even if the engine 4 is in an idling state.

More particularly, the disc spring 83 biases the slide shaft 201 leftward via the pressure plate 77, bearing 104, and the second pressure plate 103. Similarly, the disc spring 83 biases the second cam plate 203 leftward via the pressure plate 77, bearing 104, second pressure plate 103, slide shaft 201, and support plate 250. By contrast, the coil spring 205 biases the slide shaft 201 and the second cam plate 203 rightward as a result of the torsion force the spring 205 generates on the second cam plate 203, which in turn is converted by the toggle mechanism 200 into an axial force. This axial force is applied to the second cam plate 203 which in turn urges the slide shaft 201 rightward via support plate 250.

The term "idling state" generally means a state in which the engine 4 is running and the accelerator grip (not shown) of the motorcycle 1 is not turned by the rider. In the present embodiment, the pressure plate 77 is constantly urged toward the plate group 66 by the entirety of the plate spring 83 and the coil spring 205. Even in the idling state, the friction plate 64 and the clutch plate 65 thereby contact each other and transmit a portion of a rotation driving force while sliding. Thus, the clutch 2 is in a so-called partial clutch engagement state even when the engine is in an idling state.

Figure 6A:
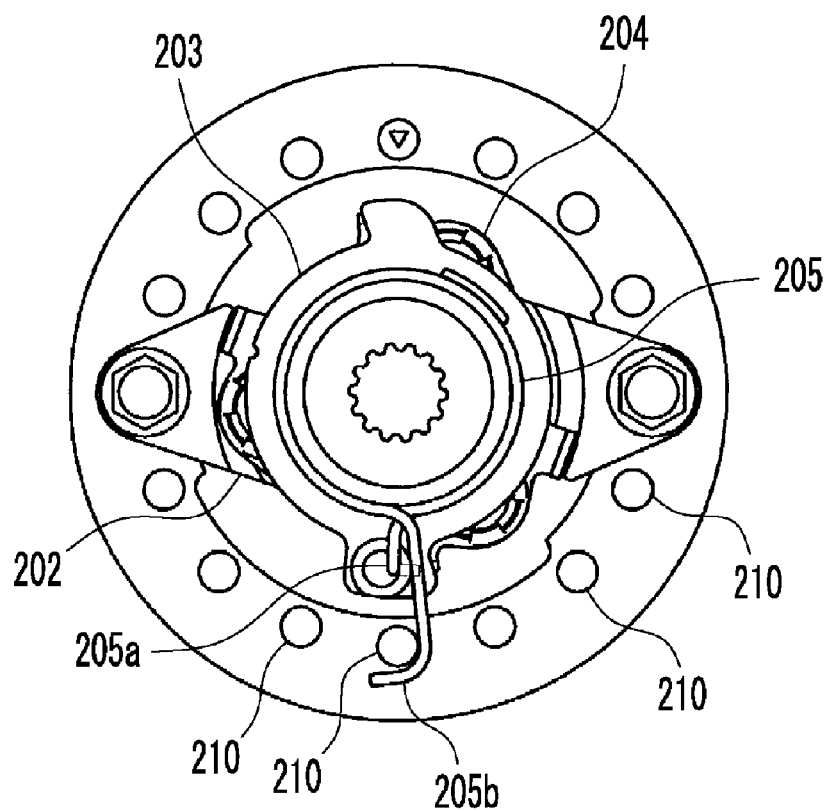
FIGS. 6a and 6b are front views of a toggle mechanism in alternative modes of operation.
Figure 6B:
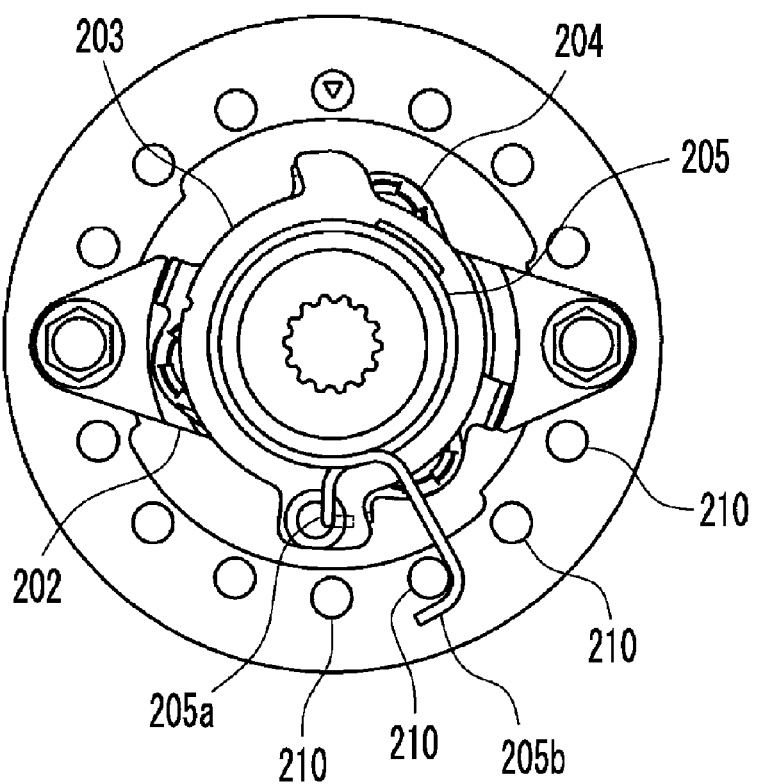

As shown in FIGS. 6a and 6b, the clutch 2 includes a plurality of pins 210 arranged circumferentially about a rotational center of the pressure plate 77 (which corresponds to a center of the coil spring 205). These pins 210 are formed to be able to secure one end 205b of the coil spring 205. Thus, by appropriately selecting the pins 210 to secure one end 205b of the coil spring 205, the torsional force of the coil spring 205 can be adjusted, which in turn will adjust the axial biasing force generated by spring 205 via toggle mechanism 200. For example, by changing the pin 210 securing one end 205b of the coil spring 205 from the pin 210 shown in FIG. 6(a) to that shown in FIG. 6(b), the axial biasing force of the coil spring 205 against the pressure plate 77 can be increased.

Clutch Release Mechanism 86

The clutch 2 according to the present embodiment includes a clutch release mechanism 86 (FIG. 3). The clutch release mechanism 86 forcibly releases a pressure-contact state of the plate group 66 in response to the operation of the clutch lever 24 by a rider. This clutch release mechanism 86 enables the clutch 2 to be disengaged by the manual operation of a rider of the motorcycle 1.

As stated above, in the motorcycle 1 according to the present embodiment, the clutch 2 is configured so as to be in the partial clutch disengagement state even when the engine is in an idling state. However, the clutch release mechanism 86 can completely disengage the partially engaged clutch 2.

The clutch release mechanism 86 includes the push mechanism 43 (see FIG. 3) and a drive mechanism 87 (see FIG. 4) for driving the push mechanism 43. As shown in FIG. 3, the push mechanism 43 includes the short push rod 43a, the long push rod 43b, and the ball 43c interposed between the short push rod 43a and the long push rod 43b. The through-hole 33a is formed in the main shaft 33 and the push mechanism 43 is arranged within the through-hole 33a. It should be noted that the through-hole 33a also serves as an oil supply path for supplying the oil to the respective sliding portions or the like of the clutch 2. Specifically, the oil is supplied to the respective sliding portions of the clutch 2 via the gap 89 between the inner wall of the through-hole 33a and the push mechanism 43.

A right end of the short push rod 43a protrudes from the main shaft 33 and is attached to the first pressing plate 102 of the sub clutch 100. Thus, when the sub clutch 100 is engaged, the short push rod 43a rotates with the pressure plate 77. Further, when the sub clutch 100 and the clutch 2 are engaged, the short push rod 43a rotates along with the clutch housing 46. On the other hand, the long push rod 43b does not rotate along with the main shaft 33. Thus, the ball 43c is provided between the short push rod 43a and the long push rod 43b to reduce the sliding resistance between the short push rod 43a and the long push rod 43b.

FIG. 4 is a cross-sectional view showing the push rod drive mechanism 87. In the present embodiment, as shown in FIG. 4, the left end of the long push rod 43b extends to the push rod drive mechanism 87. In FIG. 4, the section below the longitudinal axis of the main shaft 33 represents the state in which the clutch release mechanism 86 is not being driven. In other words, the section below the longitudinal axis of the main shaft 33 in FIG. 4 represents the state in which the push mechanism 43 is shifted relatively to the left and the pressure plate 77 is not displaced rightward by the push mechanism 43. On the other hand, the section above the longitudinal axis of the main shaft 33 in FIG. 4 represents the state in which the clutch release mechanism 86 is being driven. In other words, the section above the longitudinal axis of the main shaft 33 represents the state in which the push mechanism 43 is shifted relatively to the right and the pressure plate 77 is displaced rightward by the push mechanism 43.

As shown in FIG. 4, the drive mechanism 87 includes a cylinder 90 and a piston 91. The piston 91 is slidable within the cylinder 90 in the axial direction of the main shaft 33. The piston 91 is attached to the long push rod 43b. Thus, when the piston 91 slides, the long push rod 43b also moves in the axial direction of the main shaft 33.

An operating chamber 92 is defined and formed between the piston 91 and the inner wall of cylinder 90. The operating chamber 92 is filled with the oil.

A helical compression spring 93 is disposed between the piston 91 and the crankcase 31. The piston 91 is urged leftward in FIG. 4 away from the crankcase 31 by the helical compression spring 93. In other words, the piston 91 is urged in the direction in which the push mechanism 43 is displaced leftward to engage the clutch 2. Thus, when a rider of the motorcycle 1 releases the operation of the clutch lever 24 (FIG. 1), the push mechanism 43 automatically moves leftward.

Clutch Operation

The operation of the clutch 2 will now be described. First, an operation for causing the clutch 2 to be disengaged will be described.

When a rider of the motorcycle 1 grasps the clutch lever 24 (see FIG. 1), the internal pressure of the operating chamber 92 of the drive mechanism 87 rises. The piston 91 thereby moves rightward (in FIG. 4) and the long push rod 43b also moves rightward. The ball 43c and the short push rod 43a thereby move to the right and the first pressing plate 102 of the sub clutch 100 moves rightward. The friction plate 101 of the sub clutch 100 is thereby sandwiched between the first pressing plate 102 and the second pressing plate 103, thus rotating the sub clutch 100 into a connected state. The slide shaft 201 of the toggle mechanism 200 thereby rotates along with the pressure plate 77 in a predetermined direction.

If the slide shaft 201 rotates in the predetermined direction, the second cam plate 203 of the toggle mechanism 200 also rotates in the same direction. The balls 204a on the ball plate 204 thereby ride up on opposing cam lobes of the first cam surface 202a and the second cam surface 203a and the second cam plate 203 is pressed rightward by the balls 204a. The slide shaft 201 is thereby pressed rightward. As a result, the pressure plate 77 moves rightward by a force by which the short push rod 43a presses the pressure plate 77 rightward via the first pressing plate 102 and the friction plate 101 and a force by which the slide shaft 201 pulls the pressure plate 77 rightward via the second pressing plate 103 and the bearing 104. The pressure-contact state of the disc group 66 is thereby released to disengage the clutch 2.

It should be noted that rotation of the second cam plate 203 is restricted so as not to exceed a predetermined amount. For this reason, in the state in which the clutch 2 is disengaged, the friction plate 101 rotates with respect to the first pressing plate 102 and the second pressing plate 103. That is, the friction plate 101 slides with respect to the first pressing plate 102 and the second pressing plate 103. However, since the oil is supplied to the first friction surface 101a and the second friction surface 101b of the friction plate 101, wear of the friction plate 101 is suppressed.

Operation when the clutch 2 is engaged will next be described.

When the clutch 2 is engaged, a rider lets go of his or her hold of the clutch lever 24 which the rider has grasped to disengage the clutch. The internal pressure of the operating chamber 92 of the drive mechanism 87 thereby decreases. The piston 91 and the long push rod 43b move leftward in FIG. 4 accordingly. The ball 43c and the short push rod 43a also move to the left and the first pressing plate 102 of the sub clutch 100 moves leftward. Due to this, the first pressing plate 102 of the sub clutch 100 separates from the friction plate 101. Further, the second pressing plate 103 is not pressed rightward by the first pressing plate 102. Consequently, a rightward pressing force against the slide shaft 201 is eliminated and the second cam plate 203 that has received the torsional force of the coil spring 205 rotates in the opposite direction, whereby the second cam plate 203 and the slide shaft 201 move to the left. As a result, the second pressing plate 103 also moves leftward.

Moreover, because the rightward pressing force applied by the first pressing plate 102 has been removed, the pressure plate 77 moves leftward by the biasing force of the disc spring 83. As a consequence, the pressure plate 77 pressure-contacts the plate group 66 to engage the clutch 2. At this time, the friction plate 101 of the sub clutch 100 separates from the second pressing plate 103.

In the clutch 2 according to the present embodiment, the biasing force applied to the pressure plate 77 by the disc spring 83 varies according to the radial position of the roller weight 41. Specifically, when the rpm of the pressure plate 77 is large, the roller weight 41 moves outward in a radial direction. As a result, the roller weight 41 moves rightward to greatly deform the disc spring 83. Accordingly, the plate spring 83 is greatly deformed by the roller weight 41 without the need to set a high coefficient of elasticity of the disc spring 83 itself. Thus, the biasing force applied to the pressure plate 77 by the disc spring 83 becomes relatively large.

On the other hand, when the rpm of the pressure plate 77 is small, the roller weight 41 moves inward in the radial direction. As a result, the roller weight 41 moves leftward and the deformation extent of the disc spring 83 becomes relatively small. Accordingly, the biasing force applied to the pressure plate 77 by the disc spring 83 becomes relatively small.

When the rpm of the engine is large, the pressure plate 77 presses the plate group 66 with a large pressing force. In the clutch 2 according to the present embodiment, when the rpm of the engine is large, the roller weight 41 moves outward in a radial direction and the deformation extent of the disc spring 83 thereby increases. Thus, a sufficiently large pressing force can be obtained without setting high the coefficient of elasticity of the disc spring 83. It is, therefore, possible to suppress the coefficient of elasticity of the disc spring 83 to be relatively low, that is, to suppress the spring capacity to be relatively small.

Advantages of the Embodiment

As described above, in the motorcycle 1 according to the present embodiment, even in the idling state, the pressure plate 77 enables the friction plate 64 to contact the clutch plate 65 to transmit a portion of the driving force of the clutch housing 46 to the clutch boss 48. Namely, the clutch 2 turns into a partially engaged state. Thus, even in the idling state, a portion of the driving force of the engine 4 is transmitted to the rear wheel 19 and the rear wheel 19 is driven. Consequently, although the motorcycle 1 includes a clutch 2 (which is a centrifugal clutch), the motorcycle 1 can run in the idling state. Therefore, a rider can drive the motorcycle 1 at low speed by appropriately operating the clutch lever 24 without frequently turning back and forth the acceleration grip.

According to the present embodiment, the clutch 2 includes the disc spring 83 and the coil spring 205 that collectively act as an elastic body that constantly biases the pressure plate 77 toward the plate group 66 so as to maintain the plate group 66 in a pressed-contact state even in an engine idling state. In this way by providing the elastic bodies that constantly urge the pressure plate 77 toward the plate group 66 even in the idling state, a motorcycle 1 exhibiting the functions and advantages described hereinabove can be readily realized.

According to the present embodiment, the biasing force of the coil spring 205 against the pressure plate 77 is adjustable. Thus, the degree of the partial clutch engagement state in the idling state, that is, by how much degree the driving force is transmitted from the clutch housing 46 to the clutch boss 48 can be adjusted relatively easily. Moreover, even if the plate group 66 is worn by aging degradation, a power transmission performance of the plate group 66 can be recovered to some extent by weakening the biasing force of the coil spring 205 (in other words, by increasing the biasing force of the entirety of the disc spring 83 and the coil spring 205 for biasing the pressure plate 77 leftward).

Furthermore, in the present embodiment, the coil spring 205 is configured so that a position of one end 205b of the coil spring 205 can be adjusted. By adjusting the position of end 205b, the biasing force can be adjusted. In the present embodiment, the other end 205a of the coil spring 205 is fixed. Alternatively, positions of the both ends 205a and 205b can be made adjustable. More specifically, the clutch 2 according to the present embodiment includes a plurality of pins 210 arranged circumferentially around the rotational center of the pressure plate 77 and capable of securing one end 205b of the coil spring 205. The biasing force of the coil spring 205 against the pressure plate 77 can be adjusted by appropriately selecting the pin 210 securing one end 205b of the coil spring 205, that is, according to the position of the pin 210 to be secured. According to the present embodiment, therefore, the biasing force of the coil spring 205 can be easily adjusted.

In the present embodiment, the clutch 2 is a so-called multiplate centrifugal clutch including a plurality of friction plates 64 and a plurality of clutch plates 65. In the case of a conventional multiplate centrifugal clutch, the shock generated during clutch engagement depends solely on the moving manner of a centrifugal weight. The shock during the clutch engagement increases when the centrifugal weight moves quickly. For this reason, depending on the shape, dimensions and the like of the centrifugal weight, a shock generated at the time that the clutch starts to engage after the accelerator is opened becomes relatively large. Ride feeling during the low speed driving is thus not always satisfactory.

The motorcycle 1 according to the present embodiment, by contrast, can run at low speed by operating the clutch lever 24. Therefore, the motorcycle 1 according to the present embodiment can improve the ride although the motorcycle 1 includes a multiplate centrifugal clutch.

In the present embodiment, the clutch 2 includes the toggle mechanism 200 that receives the torque of the pressure plate 77 and converts the torque into a force for moving the pressure plate 77 rightward during clutch disengagement by operating the clutch lever 24. According to the present embodiment, by providing such a toggle mechanism 200, the burden on a rider who operates the clutch lever 24 is mitigated.

Furthermore, according to the present embodiment, providing the toggle mechanism 200 enables the clutch capacity to be increased. Namely, the driving force which the clutch 2 can transmit can be increased. In this case, according to the conventional centrifugal clutch, when the clutch capacity increases, the shock generated when the centrifugal clutch is automatically engaged from the idling state tends to increase. According to the present embodiment, by contrast, even if the clutch capacity is large, the shock following the clutch engagement does not occur since the clutch 2 is not automatically switched from the disengagement state to the engagement state.

Modification

In the present embodiment as described hereinabove, the elastic body that constantly biases the pressure plate 77 toward the plate group 66 comprises the disc spring 83 and the coil spring 205. However, the elastic body is not limited to a combination of a plurality of elastic members but may be formed out of a single elastic member. Furthermore, a torsion spring other than the coil spring 205 can be used. Moreover, the number of turns of the torsion spring is not limited to a specific number of turns. Besides, the elastic body may include a spring other than the torsion spring or an elastic body other than the spring.

As described above, the present invention is useful for a motorcycle which includes a centrifugal clutch.

While an embodiment has been described in connection with the figures hereinabove, the invention is not limited to this embodiment, but rather can be modified and adapted as appropriate. Thus, it is to be clearly understood that the above description was made only for purposes of an example and not as a limitation on the scope of the invention as claimed below.

What is claimed:

1. A motorcycle, comprising:
an engine that generates a drive force;
a drive wheel;
a centrifugal clutch configured to transmit drive force from the engine to the drive wheel; and
a clutch actuating element configured to disengage the centrifugal clutch when activated by a rider, wherein the centrifugal clutch comprises:
a drive-side solid of revolution including a first plate;
a driven-side solid of revolution including a second plate opposed to the first plate in a predetermined direction;
a pressure plate attached to the drive-side solid and configured to rotate with the drive-side solid of revolution, the pressure plate pressing the first plate into the second plate by moving in the predetermined direction, and the pressure plate pressing the first plate into the second plate with sufficient force to transmit a portion of the torque of the drive-side solid of revolution from the first plate to the driven side solid of revolution via the second plate when the engine is in an idling state; and
a centrifugal weight that moves outward in a radial direction of the pressure plate according to a centrifugal force applied to the weight, the centrifugal weight increasing the force by which the pressure plate presses the first plate into the second plate as it moves outward in the radial direction.

2. The motorcycle of claim 1, wherein the centrifugal clutch includes an elastic body that biases the pressure plate toward the first plate and the second plate in such a way that the first plate contacts the second plate when the engine is in an idling state.

3. The motorcycle of claim 2, wherein the biasing force of the elastic body applied to the pressure plate is adjustable.

4. The motorcycle of claim 3, wherein the elastic body includes a torsion spring having an attachment position on one end or both ends, at least one attachment position being adjustable.

5. The motorcycle of claim 4, further comprising a plurality of pins arranged circumferentially about a rotational center of the pressure plate, the pins being configured to secure one end of the torsion spring, wherein the biasing force of the torsion spring is adjusted based on the position of the pin on which the torsional spring is secured.

6. The motorcycle of claim 1, wherein the drive-side solid of revolution includes a plurality of the first plates, the driven-side solid of revolution includes a plurality of the second plates, and the plurality of first plates and the plurality of second plates are alternately arranged along the predetermined direction.

7. The motorcycle of claim 2, wherein the centrifugal clutch further includes a toggle mechanism that receives torque from the pressure plate when the clutch actuating element is operated to disengage the clutch and converts the torque into a force for moving the pressure plate in a direction in which the first plate separates from the second plate.

8. The motorcycle of claim 7, further comprising a sub clutch, the sub clutch including a friction plate and a pressing body, the friction plate configured to rotate along with the pressure plate and move axially with the pressure plate, and the pressing body receiving the torque of the pressure plate through frictional contact with the friction plate and communicating the received torque to the toggle mechanism when the clutch actuating mechanism is operated to disengage the clutch.

9. The motorcycle of claim 8, wherein the toggle mechanism comprises:
a first cam plate having a first cam surface formed thereon;
a second cam plate having a second cam surface formed thereon, the second cam plate arranged so that the second cam surface opposes the first cam surface;
a cam ball interposed between the first cam surface and the second cam surface;
a rotary shaft fixed to the pressing body of the sub clutch, the rotary shaft being attached to the second cam plate so as to rotate along with the second cam plate, the rotary shaft receiving the torque of the pressure plate via the sub clutch when the clutch actuation element is operated to disengage the clutch and rotating the second cam plate in a predetermined rotational direction relative to the first cam plate; wherein
when the second cam plate rotates relative to the first cam plate in the predetermined rotational direction, the cam ball is interposed between cam lobes on the opposing cam surfaces and thereby pushes the second cam plate away from the first cam plate so as to separate the second cam plate from the first cam plate.

10. The motorcycle of claim 9, wherein the elastic body comprises:
a first spring that biases the pressure plate toward the first plate and the second plate; and
a second spring that biases the pressure plate away from the first plate and the second plate.

11. The motorcycle of claim 6, further comprising a clutch release mechanism which forcibly releases the pressed-contact state of the first and second plates when the clutch actuation mechanism is operated to disengage the clutch.

12. The motorcycle of claim 11, wherein the clutch release mechanism includes a push mechanism and a mechanism for driving the push mechanism.

13. The motorcycle of claim 12, wherein the push mechanism includes a first push rod, a second push rod, and at least one ball interposed between the first and second push rods.

14. The motorcycle of claim 13, wherein the push mechanism is arranged within a through-hole of a main shaft of a transmission.

15. A motorcycle, comprising:
an engine that generates a drive force;
a drive wheel;
a centrifugal clutch configured to transmit the drive force from the engine to the drive wheel, the centrifugal clutch comprising a pressure plate, an elastic body, and a clutch plate group, the pressure plate being biased by the elastic body in a predetermined direction to press the clutch plate group into contact with sufficient force to transmit a portion of the torque of a drive-side solid of revolution to a driven side solid of revolution via the clutch plate group even when the engine is in an idling state;
a clutch actuating element configured to disengage the centrifugal clutch when activated by a rider.

16. The motorcycle of claim 1, wherein the elastic body includes a disc spring biasing the pressure plate in the predetermined direction and a coil spring biasing the pressure plate in a direction opposite the predetermined direction.

17. The motorcycle of claim 15, further comprising a sub clutch, the sub clutch including a friction plate configured to rotate along with the pressure plate and move axially with the pressure plate, and a pressing body, the pressing body receiving torque from the pressure plate through frictional contact with the friction plate and moving the pressure plate in a direction away from the clutch plate group when the clutch actuation element is operated to disengage the clutch plate group.

18. The motorcycle of claim 17, wherein the centrifugal clutch further includes a toggle mechanism that receives the torque received by the pressing body when the clutch actuating element is operated to disengage the clutch and converts the torque into a force for moving the pressure plate in a direction away from the clutch plate group.

19. The motorcycle of claim 17, wherein the toggle mechanism comprises a ball cam.

* * * * *